(12) United States Patent
Röther et al.

(10) Patent No.: US 12,390,844 B2
(45) Date of Patent: Aug. 19, 2025

(54) METHOD FOR RECYCLING CELLULOSE ACETATE-CONTAINING MATERIAL, PELLETS, EXTRUDATE, GRANULATE THEREOF, AND SYSTEMS FOR RECYCLING CELLULOSE ACETATE-CONTAINING MATERIAL

(71) Applicant: CERDIA INTERNATIONAL GMBH, Basel (CH)

(72) Inventors: Stefan Röther, Freiburg (DE); Uwe Schäffner, Vörstetten (DE); André Schönberger, Bantzenheim (FR)

(73) Assignee: CERDIA INTERNATIONAL GMBH (CH)

( * ) Notice: Subject to any disclaimer, the term of this patent is extended or adjusted under 35 U.S.C. 154(b) by 473 days.

(21) Appl. No.: 17/795,761

(22) PCT Filed: Jan. 12, 2021

(86) PCT No.: PCT/EP2021/050437
§ 371 (c)(1),
(2) Date: Jul. 27, 2022

(87) PCT Pub. No.: WO2021/151650
PCT Pub. Date: Aug. 5, 2021

(65) Prior Publication Data
US 2023/0052269 A1      Feb. 16, 2023

(30) Foreign Application Priority Data
Jan. 29, 2020    (DE) .................... 10 2020 102 079.1

(51) Int. Cl.
*B09B 3/32* (2022.01)
*B09B 3/35* (2022.01)
*B09B 101/20* (2022.01)
*C08J 3/12* (2006.01)
*C08K 5/11* (2006.01)

(52) U.S. Cl.
CPC .................. *B09B 3/32* (2022.01); *B09B 3/35* (2022.01); *C08J 3/12* (2013.01); *C08K 5/11* (2013.01); *B09B 2101/20* (2022.01); *C08J 2301/12* (2013.01)

(58) Field of Classification Search
CPC ............. A24D 3/10; B29B 2017/0031; B29B 17/0026–0047; B29B 9/08; B29B 13/04–045; B29K 2001/12; B29C 35/16; B29C 2035/1608–1691; B29C 48/87–873; B01J 2/20; C08J 3/12
See application file for complete search history.

(56) References Cited

U.S. PATENT DOCUMENTS

| | | |
|---|---|---|
| 5,504,120 A | 4/1996 | Hopkins et al. |
| 2007/0043148 A1 | 2/2007 | Yi et al. |
| 2016/0068665 A1* | 3/2016 | Budhavaram .......... C08L 23/12 524/37 |
| 2019/0364959 A1 | 12/2019 | Huang et al. |

FOREIGN PATENT DOCUMENTS

| | | |
|---|---|---|
| CA | 893501 A | 2/1972 |
| CN | 3174743 U | 4/2012 |
| CN | 108601394 A | 9/2018 |
| DE | 1931137 A1 | 1/1970 |
| DE | 2501209 A1 | 7/1976 |
| DE | 69301892 T2 | 9/1996 |
| DE | 69424059 T2 | 9/2000 |
| DE | 10153821 A1 | 11/2001 |
| DE | 102011010260 A1 | 8/2012 |
| DE | 102017011894 A1 | 6/2019 |
| JP | S4915471 | 4/1974 |
| JP | 60083800 | 5/1985 |
| JP | 04263906 A | 9/1992 |
| JP | 2014520945 A | 8/2014 |
| SU | 1011039 A3 | 4/1983 |
| WO | 2010026461 A1 | 3/2010 |
| WO | 2010054514 A | 5/2010 |

OTHER PUBLICATIONS

Machine Translation of DE69301892T2. Sep. 5, 1996. (Year: 1996).*
Machine Translation of DE69424059T2. Sep. 7, 2000. (Year: 2000).*
Machine Translation of JPS49-15471 B1. Apr. 15, 1974. (Year: 1974).*

* cited by examiner

*Primary Examiner* — Stephen E Rieth
(74) *Attorney, Agent, or Firm* — Greenberg Traurig, LLP

(57) ABSTRACT

The invention relates to a method for recycling cellulose acetate-containing material, such as a filter tow starting material which consists of cellulose acetate or at least has cellulose acetate. The method has the following steps: supplying a filter tow starting material to a pelletizing press; and pelletizing the filter tow starting material in the pelletizing press in order to convert the filter toe starting material into pellets, wherein the converted pellets have a higher density than the supplied filter tow starting material, and the filter tow starting material, the pellets, and/or intermediate stages of the material are cooled at least temporarily during the pelletizing process.

11 Claims, No Drawings

METHOD FOR RECYCLING CELLULOSE ACETATE-CONTAINING MATERIAL, PELLETS, EXTRUDATE, GRANULATE THEREOF, AND SYSTEMS FOR RECYCLING CELLULOSE ACETATE-CONTAINING MATERIAL

CROSS-REFERENCE TO RELATED APPLICATIONS

The present application is a national phase application under 35 USC § 371 of International Application No. PCT/EP2021/050437, filed on Jan. 12, 2021, which claims priority to Germany Patent Application No. DE 10 2020 102 079.1 filed on Jan. 29, 2020, the entire contents and disclosures of all of which are hereby incorporated by reference herein.

The invention relates to methods for recycling materials containing cellulose acetate.

In particular, the invention relates to methods for recycling filter tow material, particularly filter tow starting material, cigarette rod waste material and/or cigarette filters. In addition, the invention relates to pellets, extrudate and granulate stemming from such methods and systems for recycling filter tow material, particularly filter tow starting material, cigarette rod waste material and/or cigarette filters.

Approximately 800 kt of filter tow is processed into filter rods around the world each year in the cigarette industry, with the rods then being further processed into cigarettes. Even with highly sophisticated processes, it can be difficult to entirely prevent production waste or scraps. One can thereby assume there is a scrap rate of 1 to 2% in the production of filter rods such that there is an annual accumulation of approximately 8,000 to 16,000 tons worldwide.

This waste (filter tow material, in particular filter tow starting material) and the filter rod waste which accrues in the production of filter rods and/or cigarettes is usually disposed of by destroying it; i.e. via incineration. Since the filter tow material in its raw form and also in the form of filter rods is of extremely low density (approx. 50 kg/m$^3$), high costs are thereby incurred in the processes leading up to the disposal such as, for example, storage and transport.

Cigarette filter waste material can be seen as a further problem as approximately 5.5 trillion cigarette butts are discarded each year around the world, whereby this waste material cannot be composted or can only be done so at great effort.

The invention is thus based on the task of specifying methods, products made therefrom and systems which dispel the above-cited problems and disadvantages associated with filter tow material and filter material, particularly in the form of waste material as accrues during production and/or in the form of cigarette butts.

One solution according to the invention consists of specifying a method for recycling cellulose acetate-containing filter tow material, particularly filter tow starting material, cigarette rod waste material and/or cigarette filters, wherein the method comprises the following steps: feeding the cellulose acetate-containing material to be recycled to a pelletizing press and pelletizing the material in the pelletizing press in order to convert the cellulose acetate-containing material to be recycled into pellets, whereby the converted pellets have a higher density than the cellulose acetate-containing material as initially supplied, and whereby there is at least intermittent cooling of the cellulose acetate-containing material, the pellets and/or the intermediate stages of the material during the pelletizing.

The task is satisfactorily solved by the inventive method for recycling filter tow material, particularly filter tow starting material, cigarette rod waste material and/or cigarette filters.

The method in particular creates a material to be stored, the density of which enables more cost-effective storage. The pellets are thus simple to store and are in particular also easy to handle and transport.

When the cellulose acetate-containing material to be recycled consists exclusively of the waste which accumulates during production such as e.g. filter tow material, in particular filter tow starting material, reusing or respectively recycling the waste material (production waste) is extremely sensible. Production waste accumulates in the immediate vicinity of the production equipment and is usually only minimally contaminated or even completely uncontaminated such that barely any logistical or technological problems arise. Furthermore, the composition and condition of the cellulose acetate-containing material to be recycled is precisely known by virtue of the process monitoring.

Accordingly, it is possible to recycle the filter tow starting material which accumulates during production instead of destroying (incinerating) it. Process optimization toward more sustainable production also occurs at this point, which can overall lead to better product ecological balance.

On the other hand, the inventive method is also suited to recycling cellulose acetate-containing materials which also comprise other components in addition to cellulose acetate such as, for example, paper waste generated during filter rod production or the paper and tobacco in cigarette butts.

Cellulose acetate itself is a collective term for the acetic acid esters of cellulose. Overall, cellulose acetate is an amorphous thermoplastic obtained by the transformation of cotton and/or wood cellulose.

During pelletizing, the cellulose acetate-containing material to be recycled, which is also referred to as "starting material" in the following, is ground down and compressed, whereby the material's manifested forms between starting material and finished pellets is referred to here as intermediate material stages.

According to one advantageous development of the invention, the following step precedes the supplying of starting material: grinding of the starting material.

Depending on the form of the starting material, it can be expedient to grind it down prior to it being fed to the pelletizing press in order to ensure a smooth pelletizing process and improve the throughput of the pelletizing press.

According to one advantageous development of the invention, the starting material consists at least partially, preferably entirely, of the spinning mill wastage generated during production or filter tow bales.

This particularly provides the advantage of the accumulated spinning mill wastage or filter tow bales not being contaminated and consequently being very suitable for further processing.

According to one advantageous development of the invention, the starting material, the pellets and/or the intermediate material stages are kept below a critical temperature during the cooling.

According to one advantageous development of the invention, the critical temperature corresponds to a cellulose acetate glass transition temperature.

Cellulose acetate has a rather weak temperature and chemical resistance. The vitrification or respectively glass transition temperature of cellulose acetate thus already lies between 125° C. and 175° C. Consequently, cooling to keep the temperature below the glass transition temperature is important to the process in order to prevent the materials from thermally degrading to a point at which they are no longer usable.

According to one advantageous development of the invention, pelletizing ensues by way of a press roller and a die.

The die is in particular a punch die through which the material is pressed by press rollers and formed into strands. The strands can be endless strands which blades cut into the desired pellet length in a subsequent step of the method.

Advantageously, the roller gap width can be adjusted, preferably during operation, so as to be able to influence the pellet density or pellet quality respectively.

According to one advantageous development of the invention, the die is made from a thermally conductive material and cooling ensues by means of the die.

This has the advantage of the cooling ensuing in the immediate vicinity of the pellets and intermediate material stages particularly prone to vitrification which specifically need to be cooled.

According to one advantageous development of the invention, the cooling ensues via fluid cooling, preferably water cooling, and/or via solid object cooling.

Fluid cooling is thereby regarded as particularly suitable since it is extremely easy to implement and will also provide good cooling of the die.

According to one advantageous development of the invention, the starting material has a density of approximately 30 kg/m$^3$ to approximately 80 kg/m$^3$ and preferably a density of approximately 45 kg/m$^3$ to approximately 65 kg/m$^3$, wherein the pellets have a bulk density of approximately 350 kg/m$^3$ to approximately 650 kg/m$^3$ and preferably a bulk density of approximately 450 kg/m$^3$ to approximately 550 kg/m$^3$.

At this point, the advantage achieved through the compression and for storage as already described becomes clear. The pellets are thereby of such high density that their bulk density only amounts to approximately a tenth of the starting material's density. This thus directly results in a tenth of the space being required for storage.

In the present and also later contexts, the term "approximately" refers to a deviation of no more than 5%.

One solution according to the invention consists of specifying a method for recycling filter starting material or cigarette filters, whereby this material is composed of cellulose acetate and paper or contains cellulose acetate and paper, and whereby the method comprises the following steps: grinding the filter starting material or cigarette filter respectively; feeding the ground material to a pelletizing press; and pelletizing the material in the pelletizing press in order to convert the filter starting material/cigarette filter material into pellets, wherein the converted pellets have a higher density than the starting material as initially supplied, and wherein there is at least intermittent cooling of the filter starting material, the pellets and/or the intermediate material stages during pelletizing.

The advantages already noted with respect to the method for recycling filter tow starting material also apply here. In particular, the cost component is significantly lower due to storage of the less voluminous pellets. In addition, the pellets are much easier to transport since pneumatic conveyance in particular is possible. Generally speaking, the term "pneumatic conveyance" is to be understood as transporting bulk materials via gas (usually air) utilizing positive or negative pressure. By design, the conveyance ensues through tubes or pipes. Conveyance through fluid channels (square pipes with aerated bottoms) is also very common.

The pellets according to the invention are particularly suitable for pneumatic dilute phase, plug flow and dense phase flow conveyance.

In contrast to the aforementioned methods, however, the filter starting material and the cigarette filter material also contain paper (among other things) in addition to cellulose acetate.

The grinding of the filter starting material ensues in a shredder prior to the pelletization of the filter starting material. It is of course also conceivable here for the shredder for grinding the filter starting material to be integrated into the pelletizing press.

Since the actual pelletizing process forms the bottleneck of the production process here, the grinding process (shredding process) can serve as a metering means for the subsequent pelletizing process. This thereby effectively prevents a material jam between the shredder stage and the pelletizing stage.

Since the filter starting material and the cigarette filter material exhibit extremely low mechanical resistance, it is possible for the shredder to be designed with a low power setting at which the metering can easily occur. A throughput of approximately 150 kg/h is a realistic example throughput of the pelletizing operation/process.

According to one advantageous development of the invention, the percentage of cellulose acetate in the filter starting material is at least 90%, wherein the percentage of paper and other foreign substances such as e.g. tobacco residue in the filter starting material/cigarette filter material amounts at most to 10% (in each case minus the water content).

According to one advantageous development of the invention, the filter starting material and/or the cigarette filter material exhibits impurities and/or non-cellulose acetate components, their percentage together with that of the paper amounting to no more than 10%.

According to one advantageous development of the invention, the filter starting material consists at least partially, preferably entirely, of the filter rod waste which accumulates during production or used filter rod waste.

With respect to the references made in this context to filter starting material "percentages," these are based on the percentage by weight directly resulting from the filter starting material or cigarette filter material respectively.

There are different compositions to the filter starting material or cigarette filter material respectively. A distinction is primarily made here between the filter rod waste/scraps as accumulate during production and used filter rod waste.

Filter rod waste, or filter rod scraps respectively, consist of cellulose acetate and paper, whereby the cellulose acetate is at a percentage of at least 90%, preferably at least 94%, particularly preferentially 97%. Paper makes up the remainder, consequently amounting to a maximum of 10%.

The above-cited advantages yielded by the scrap/waste which accumulates during production again apply to this starting material as it accumulates close to the actual production and is not contaminated. In particular, the composition here is precisely known and controllable. Consequently, such a product is particularly suitable for further processing.

On the other hand, used filter rod waste is that which has already been used in cigarettes and smoked by the consumer. It is therefore the remnant of the cigarette, thus the cigarette stub or butt (=smoked cigarette filter). A paper content of up to approximately 30% is to be expected in such used filter rod waste.

Many times, consumers simply toss smoked cigarette filters onto the street, thereby resulting in an unattractive and dirty cityscape. It is therefore desirable at this point to broaden the cited method to also include used filter rod waste in addition to the filter rod scraps accumulating during production so as to recycle such smoked cigarette filters.

According to one advantageous development of the invention, the filter starting material or cigarette filter material respectively, the pellets and/or the intermediate material stages are kept below a critical temperature during the cooling.

According to one advantageous development, the critical temperature corresponds to a cellulose acetate glass transition temperature.

The aspects already noted in conjunction with the method for recycling starting material are also seen here as well such that the temperature of the materials needs to be below the glass transition temperature of the cellulose acetate.

According to one advantageous development of the method, pelletizing ensues by way of a press roller and a die. According to one advantageous development, the die is made from a thermally conductive material and cooling ensues by means of the die.

That in turn has the advantage of the cooling being able to ensue in situ; i.e. at the point where it is needed.

According to one advantageous development of the invention, the cooling ensues via fluid cooling, preferably water cooling, and/or via solid object cooling.

The aforementioned cooling is particularly easy to use and robust to implement in the case of dies. This is particularly important as the components are exposed to high pressures during pelletization.

According to one advantageous implementation of the inventive method, pelletization ensues with the aid of a cooled annular die in which radially aligned baling channels are formed, these extending from an inner surface of the annular die to an outer surface of the annular die, wherein the annular has a horizontal axis of rotation through its center point and is designed to be driveable by a drive unit in one direction of rotation. The annular die defines a compression chamber. Also advantageously provided is a working press roller wheel arranged in the compression chamber for compressing and pressing the material to be pelletized into the baling channels.

According to one advantageous development of the invention, the filter starting material/cigarette filter material has a density of approximately 30 kg/m$^3$ to approximately 80 kg/m$^3$ and preferably a density of approximately 45 kg/m$^3$ to approximately 65 kg/m$^3$, wherein the pellets have a bulk density of approximately 350 kg/m$^3$ to approximately 650 kg/m$^3$ and preferably a bulk density of approximately 450 kg/m$^3$ to approximately 550 kg/m$^3$.

Since the pellets are in the form of bulk material and are also stored as such, the decisive pellet parameter in terms of storage and transport is the bulk density and not the true density.

According to one advantageous development of the invention, the method further comprises the following steps: feeding the pellets into an extruder; supplying a plasticizer to the pellets; blending the pellets and plasticizer; and extruding the extrudate.

Here, the pellets obtained from the previous process are further processed in a subsequent stage of production. The extruder thereby preferably comprises a perforated plate to which the material to be processed is continuously conveyed.

The plasticizer serves to loosen the pellets so that they can be extruded. The blending of the pellets and the plasticizer preferably occurs within the extruder, thereby forming a thermoplastic.

According to one advantageous development of the invention, the extruder is designed as a screw extruder, preferably a twin screw extruder.

The extruder thus has a robust and simple construction which is well suited to the intended purpose of the above-cited extrusion.

According to one advantageous development, the plasticizer is triacetin and is preferably added to the pellets at a percentage of 10 to 35% by weight, preferably 15 to 25% by weight, particularly preferentially about 25% by weight.

That means that there is a percentage of 10 to 35% by weight, preferably 15 to 25% by weight, particularly preferentially approximately 25% by weight of plasticizer in the extrudate.

Triacetin is also known as glycerol triacetate, thus an ester of the glycerol triol and acetic acid. Triacetin is a typical plasticizer for paints and plastics. It is furthermore a solvent for cellulose acetate.

An additional argument in favor of using triacetin is its use as an adhesive for the production of cellulose acetate-based cigarette filters. Meaning that small amounts of it can already be present in the filter starting material.

According to one advantageous development of the invention, the method further comprises the following step: granulating and/or cutting the extrudate in a water bath to produce a granulate.

The purpose of the granulate is to enable the better processing of the substance as a thermoplastic due to its presence in a bulk mass of particles of constricted particle size able to be usefully processed. In particular, the granulate can be further processed as a thermoplastic in an injection molding process.

The inventive solution furthermore consists of specifying pellets which have been produced by means of one of the previous methods.

Due to being bulk material, the plural "pellets" is thereby used here. Of course, even just a single pellet falls within the protective scope of the claims. Of particular interest relative to the pellets are the pellets made from filter starting material, i.e. those which also contain paper in addition to the cellulose acetate. This is particularly due to same having different (better) properties than wholly cellulose acetate pellets. They are furthermore particularly suitable as starting material for an extrudate according to the invention.

In fact, a further inventive solution thus consists of specifying an extrudate having been produced by means of one of the previous methods.

The additional paper content enables the pellets to be extruded into higher-quality thermoplastics. The cellulose acetate fibers are homogeneously dissolved in this extrudate and kneaded only with the paper fiber content; i.e. the fiber content of the paper wrapping. This extrudate can be further processed like other thermoplastics.

A further solution according to the invention consists of specifying a granulate produced by means of one of the previous methods.

As indicated above, this granulate consisting of cellulose acetate, triacetin and paper exhibits better material properties than those of wholly cellulose acetate.

For example, a specimen produced from the inventive extrudate or respectively granulate which has a triacetin content of 25% by weight exhibits the following properties: a tensile strength of 52 MPa at a standard deviation of 0.5%, a fracture strength of 50.6 MPa at a standard deviation of 0.5%, a yield strain of 3.9% at a standard deviation of 0.03%, a breaking strain of 5.9% at a standard deviation of 0.7, an elastic modulus of 2.5 GPa at a standard deviation of 0.01, and a Charpy impact strength of 6.5 kJ/m$^2$ at a standard deviation of 0.7.

All of the above-cited values are thereby measured using the DIN EN ISO 527-1 specification.

On the whole, even better values thus result for the extrudate and the granulate than for pure cellulose acetate products.

According to one advantageous development, the granulate has a density of approximately 800 to approximately 1100 kg/m$^3$, preferably approximately 900 to approximately 1000 kg/m$^3$, particularly preferentially approximately 950 kg/m$^3$.

The bulk density of the granulate is approximately 500 to 600 kg/m$^3$.

One inventive solution furthermore consists of specifying a system for the recycling of starting material consisting of cellulose acetate or at least comprising cellulose acetate, wherein the system is designed to implement the following step: pelletizing starting material in a pelletizing press in order to convert the starting material into pellets, whereby the converted pellets have a higher density than the starting material initially supplied, and whereby there is at least intermittent cooling of the starting material, the pellets and/or the intermediate material stages during the pelletizing.

Alternatively, a plasticizer can also be added in order to produce thermoplastic granulate.

One inventive solution furthermore consists of specifying a system for the recycling of filter starting material consisting of cellulose acetate and paper or comprising cellulose acetate and paper, wherein the system is designed to implement the following step: grinding the filter starting material; feeding filter starting material to a pelletizing press; and pelletizing the filter starting material in the pelletizing press in order to convert the filter starting material into pellets, wherein the converted pellets have a higher density than the filter starting material as initially supplied, and wherein there is at least intermittent cooling of the filter starting material, the pellets and/or the intermediate material stages during the pelletizing.

According to one advantageous development, the filter starting material, the pellets and/or the intermediate material stages are kept below a critical temperature during the cooling, wherein the critical temperature corresponds to a cellulose acetate glass transition temperature.

The same advantages are yielded by the above-cited systems as with the aforementioned methods and products. The specifics and features noted in those respects are of course also to apply to the systems.

This also applies to the cited pellet, extrudate and granulate products. On the whole, all the specifics and features cited with respect to the method are also to extend to the products or respectively systems as described.

The invention claimed is:

1. A method for recycling filter tow starting material comprising cellulose acetate, wherein the method comprises the steps of:
    supplying cellulose acetate-containing material comprising spinning mill wastage generated during production thereof or filter tow bales;
    feeding the cellulose acetate-containing material to be recycled to a pelletizing press; and
    pelletizing the cellulose acetate-containing material in the pelletizing press in order to convert the cellulose acetate-containing material into pellets,
    wherein the pellets have a higher density than the cellulose acetate-containing material as supplied,
    wherein there is at least intermittent cooling of the cellulose acetate-containing material, the pellets and intermediate material stages of the conversion of the cellulose acetate-containing material to the pellets during the pelletizing,
    wherein the cellulose acetate-containing material, the pellets and/or the intermediate material stages of the conversion of the cellulose acetate-containing material to the pellets are kept below a critical temperature during the cooling,
    wherein the critical temperature corresponds to a cellulose acetate glass transition temperature,
    wherein the pelletizing is conducted by way of a press roller and a die,
    wherein the die is made from a thermally conductive material and the cooling is conducted by means of the die, and
    wherein the cooling is conducted via fluid cooling or via solid object cooling.

2. The method according to claim 1, further comprising the step of grinding the cellulose acetate-containing material, wherein the grinding step precedes the step of supplying the cellulose acetate-containing material.

3. The method according to claim 1, wherein the cellulose acetate-containing material has a density of approximately 30 kg/m$^3$ to approximately 80 kg/m$^3$, and wherein the pellets have a bulk density of approximately 350 kg/m$^3$ to approximately 650 kg/m$^3$.

4. A method for recycling filter starting material, wherein the method comprises the steps of:
    supplying filter starting material comprising cellulose acetate and paper, wherein the filter starting material comprises filter rod waste which accumulates during production thereof or used filter rod waste or smoked cigarette filters;
    grinding the filter starting material;
    feeding the filter starting material to a pelletizing press; and
    pelletizing the supplied filter starting material in the pelletizing press in order to convert the filter starting material into pellets,
    wherein the pellets have a higher density than the filter starting material as initially supplied, and
    wherein there is at least intermittent cooling of the filter starting material, the pellets and intermediate material stages of the conversion of the filter starting material to the pellets during the pelletizing,
    wherein the filter starting material, the pellets and the intermediate material stages of the conversion of the filter starting material to the pellets are kept below a critical temperature during the cooling,
    wherein the critical temperature corresponds to a cellulose acetate glass transition temperature,
    wherein the pelletizing is conducted by way of a press roller and a die,
    wherein the die is made from a thermally conductive material and the cooling is conducted by means of the die, and
    wherein the cooling is conducted via fluid cooling, or via solid object cooling.

5. The method according to claim 4, wherein a percentage of the cellulose acetate in the filter starting material is at least 90% by weight, and wherein a percentage of the paper in the filter starting material is at most to 10% by weight.

6. The method according to claim 4, wherein the filter starting material includes impurities, wherein a percentage by weight of the impurities in the filter starting material together with the percentage of the paper, minus any water content that may be present in the filter starting material, is no more than 10% by weight.

7. The method according to claim 4, wherein the filter starting material has a density of approximately 30 kg/m$^3$ to approximately 80 kg/m$^3$, and wherein the pellets have a bulk density of approximately 350 kg/m$^3$ to approximately 650 kg/m$^3$.

8. The method according to of claim 4, wherein the method further comprises the steps of:
   feeding the pellets into an extruder;
   supplying a plasticizer to the pellets;
   blending the pellets and the plasticizer; and
   extruding an extrudate of the blended pellets and plasticizer.

9. The method according to claim 8, wherein the extruder is a screw extruder.

10. The method according to claim 8, wherein the plasticizer is triacetin, and wherein the triacetin is added to the pellets at a percentage of 10% to 35% by weight.

11. The method according to claim 8, wherein the method further comprises the step of:
    granulating and/or cutting the extrudate in a water bath to produce a granulate.

* * * * *